United States Patent
Singer

(10) Patent No.: US 7,295,668 B2
(45) Date of Patent: Nov. 13, 2007

(54) PREDICTIVE DIALING BY MONITORING PROGRESS OF AGENT SCRIPT

(75) Inventor: Danny Singer, London (GB)

(73) Assignee: Noetica Ltd. (GB)

( * ) Notice: Subject to any disclaimer, the term of this patent is extended or adjusted under 35 U.S.C. 154(b) by 0 days.

(21) Appl. No.: 10/532,865

(22) PCT Filed: Oct. 28, 2003

(86) PCT No.: PCT/GB03/04671

§ 371 (c)(1),
(2), (4) Date: May 12, 2006

(87) PCT Pub. No.: WO2004/040889

PCT Pub. Date: May 13, 2004

(65) Prior Publication Data

US 2006/0251237 A1    Nov. 9, 2006

(30) Foreign Application Priority Data

Oct. 29, 2002    (GB) ................................ 0225154.4

(51) Int. Cl.
*H04M 3/00* (2006.01)

(52) U.S. Cl. .................... 379/265.01; 379/265.02; 379/265.03; 379/265.1; 379/266.08; 379/309

(58) Field of Classification Search .......... 379/265.01, 379/265.02, 265.03, 265.1, 266.08, 309
See application file for complete search history.

(56) References Cited

U.S. PATENT DOCUMENTS

| 5,341,412 | A | 8/1994 | Ramot et al. |
| 5,561,711 | A | 10/1996 | Muller |
| 5,570,419 | A | 10/1996 | Cave et al. |
| 5,640,445 | A | 6/1997 | David |
| 5,819,029 | A | 10/1998 | Edwards et al. |
| 5,999,617 | A | 12/1999 | Oyanagi et al. |
| 6,466,664 | B1 | 10/2002 | Zhao |

FOREIGN PATENT DOCUMENTS

| EP | 0 690 602 A2 | 1/1996 |
| EP | 0 690 602 A3 | 1/1996 |
| GB | 2 344 964 A | 6/2000 |
| WO | WO 01/80540 A1 | 10/2001 |

*Primary Examiner*—Quynh H. Nguyen
(74) *Attorney, Agent, or Firm*—Finnegan, Henderson, Farabow, Garrett & Dunner, L.L.P.

(57) ABSTRACT

A call centre includes a plurality of agent workstations, each agent workstation comprising means for entering information obtained from a telephone respondent in response to questions prompted by a script displayed on the display of the workstation, and means for producing status signals indicative of the progression of the agent through the script. A predictive dialling system receives status signals from each agent station and predicts from the status signals and statistical information regarding the number of calls previously made, how many new calls should be dialled to enable agents who have finished their previous call by the time the calls are answered to take the new calls.

27 Claims, 8 Drawing Sheets

FIG. 8

Surveys - Opinion Poll

What is your voting intention in the next election?

Interviewee | Background | LastElection | VotingIntention

⊙ Labour   ○ Conservative
○ Liberal Democrat   ○ Other Parties
○ Undecided   ○ Will not say Ready To Take Calls

PREDICTIVE DIALING BY MONITORING PROGRESS OF AGENT SCRIPT

This invention relates to call centre dialling management systems. In particular the invention relates to predictive dialling systems for use in call centres in which the call centre agents have to call, in sequence, telephone numbers from a long list of telephone numbers in order to obtain information from the telephone respondent answering each call. Such information may be intended to persuade the respondent to purchase services such as banking services or telephony services, or be for polling purposes for example to determine each respondent's political allegiance.

Call centres use a large number of agents who each have workstations linked by a Computer-Telephony Integration (CTI) system which integrates the computer and telephony systems. Such CTI systems include such features as automatic call distribution for management of incoming calls, call accounting to enable collection of call-related information, trend analysis and agent performance and predictive dialling to enable the system to speed dial numbers in a preloaded list of telephone numbers to enable these numbers to be called in sequence before a call centre agent becomes free from a previous call and then to deliver calls which have been answered to the agent as he or she becomes available to take the next call. Predictive dialling thus cuts down agent dead time, as when an agent has finished dealing with the previous outgoing call he or she is able to immediately pick up a new answered call.

Known predictive dialling systems are based on a statistical analysis of previous call durations in order to estimate the number of agents who are likely to become available at any particular time. Such an arrangement suffers the disadvantage, however, that where the number of agents who are likely to become available at that time is over-estimated, this leaves answered calls with no agent to deal with them, the telephone respondent then being left with what appears, to the telephone respondent, to be a nuisance call. Known predictive dialling systems are therefore normally programmed with a parameter establishing the maximum nuisance call rate which can be tolerated by the system. Such prior art predictive dialling systems are thus a trade-off between high call throughput rate and a minimal nuisance call rate. In the case of quite complex conversations between each agent and a respondent, which may have different lengths dependent on the information given by the respondent, this can be particularly difficult as the estimated call time is only based on an average call duration.

It is an object of the present application to provide a predictive dialling system wherein the number of agents who are likely to be available to take further calls at a particular time and thus the number of new telephone numbers which may be dialled can be more accurately predicted than has been possible previously.

According to a first aspect of the present invention there is provided a predictive dialling system for a call centre including a plurality of agent workstations, each agent workstation comprising: means for producing signals effective to cause a display to display a script for prompting the agent in a telephone conversation with a telephone respondent; means for entering information obtained from the telephone respondent in response to questions prompted by the script into the workstation; and means for producing status signals indicative of the progression of the agent through the script; the predictive dialling system comprising: means for storing statistical data regarding the connection of previous telephone calls; means for receiving the status signals produced by each agent station; means for predicting from the statistical data and the status signals how many new calls should be dialled to enable agents who have finished their previous call by the time each new call is answered by a respective telephone respondent to take all the new calls; and means for generating signals effective to cause said new calls to be dialled.

According to a second aspect of the present invention there is provided a scripting system for use in an agent workstation in a call centre, the workstation comprising: means for receiving telephone calls; and a display means; the scripting system comprising: means for providing signals effective to cause the display means to display a script for prompting an agent in a telephone call with a telephone respondent; means for recording information obtained from the telephone respondent and sending signals representative of said information to a storage means; means for producing status signals representative of the progression of the agent through the script; and means for sending said status signals to a predictive dialling system.

According to a third aspect of the present invention there is provided a predictive dialling method for a call centre including a plurality of agent workstations, each agent workstation performing the steps of: producing signals effective to cause a display to display a script for prompting the agent in a telephone conversation with a telephone respondent; entering information obtained from the telephone respondent in response to questions prompted by the script into the workstation; and producing status signals indicative of the progression of the agent through the script; the predictive dialling method comprising: storing statistical data regarding the connection of previous telephone calls; receiving the status signals produced by each agent station; predicting from the statistical data and the status signals how many new calls should be dialled to enable agents who have finished their previous call by the time each new call is answered by a telephone respondent to take all the new calls; and generating signals effective to cause said new calls to be dialled.

According to a fourth aspect of the present invention there is provided a scripting method in an agent workstation in a call centre, the workstation comprising: means for receiving telephone calls; and a display means; the scripting method comprising the steps of: providing signals effective to cause the display means to display a script for prompting an agent in a telephone call with a telephone respondent; recording information obtained from the telephone respondent and sending signals representative of said information to a storage means; producing status signals representative of the progression of the agent through the script; and sending said status signals to a predictive dialling system.

An aspect of the invention provides a computer program including processor implementable instructions for performing a method according to the third or fourth aspects of the invention.

An embodiment of the invention will now be described, by way of example only, with reference to the accompanying drawings in which:

FIG. 8 illustrates an example of a user interface shown on the display of the agent workstation of FIG. 2.

Overview of the Call Centre

Figure 1:
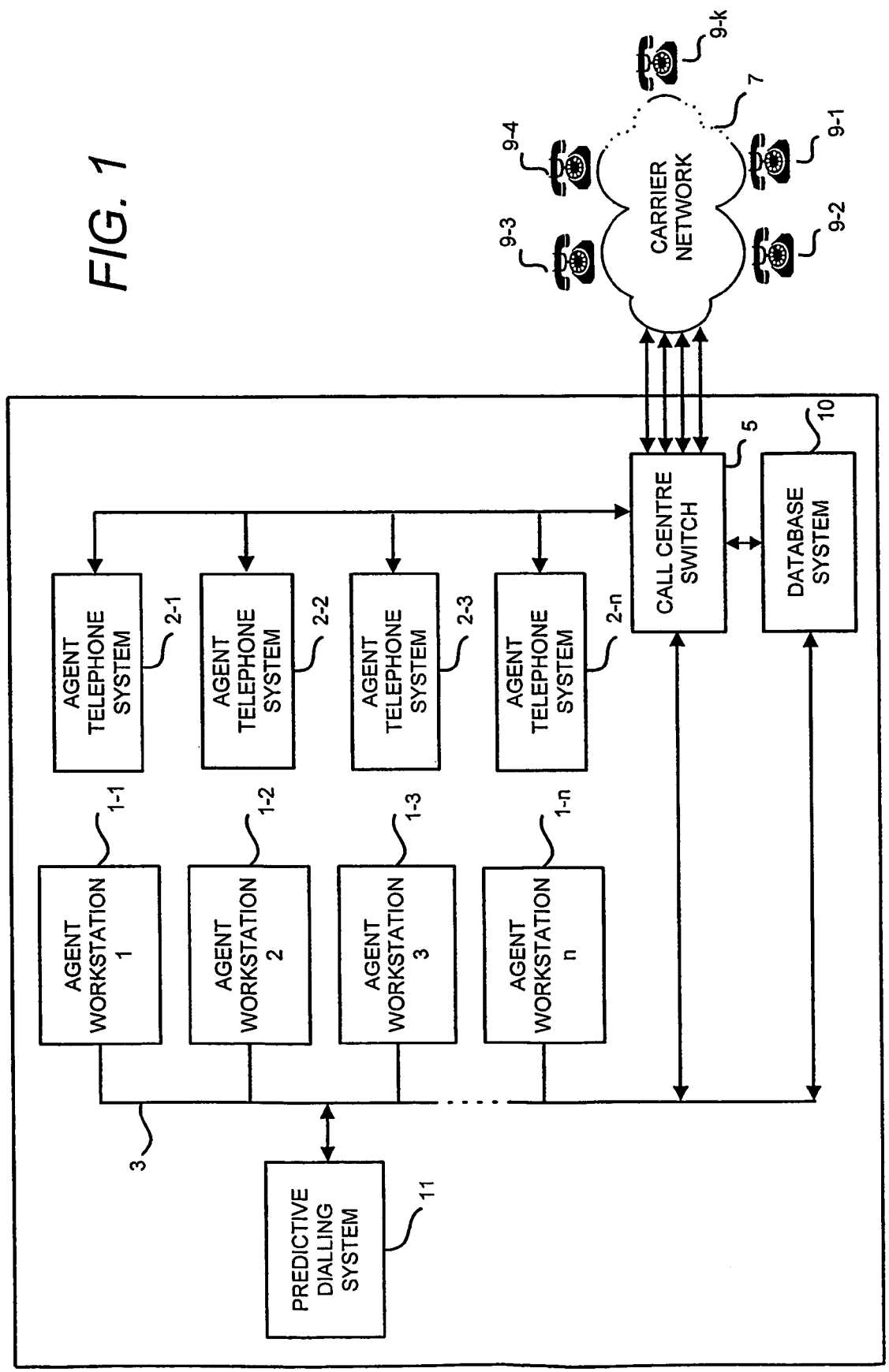
FIG. 1 is an overview of the operation of a call centre.

Turning firstly to FIG. 1, this Figure illustrates an overview of the operation of a call centre. The call centre includes a large number of agent workstations 1-1, 1-2, 1-3, . . . , 1-n. Each workstation 1-1, . . . , 1-n has a respective agent telephone system 2-1, 2-2, . . . , 2-n located at it and is connected to the components of the CTI system through a network 3. The network 3 is connected via voice links to a call centre switch 5, which is itself connected to each of the agent telephone systems 2-1, 2-2, . . . , 2-n and, via voice links, to a carrier network 7. Connected to the carrier network 7 are a large number of network respondent telephones 9-1, 9-2, . . . , 9-k which the agents may call using the network 7. The call centre switch 5 and the network 3 are both connected to a database system 10 for storing data obtained by the agents from respondents answering the telephones 9-1, 9-2, . . . , 9-k.

Also connected to the network 3 is a predictive dialling system 11 arranged to cause the call centre switch 5 to speed dial the numbers of a number of the respondent telephones 9-1 . . . 9-k connected to the network 7 at any one time. The number of calls dialled at any time is dependent on the number of agents who it is predicted will be available to deal with each call when it is answered by a respondent. The prediction is performed by monitoring the progress of each agent as they work through a scripted dialogue with each respondent as will now be described.

Agent Workstation

Figure 2:
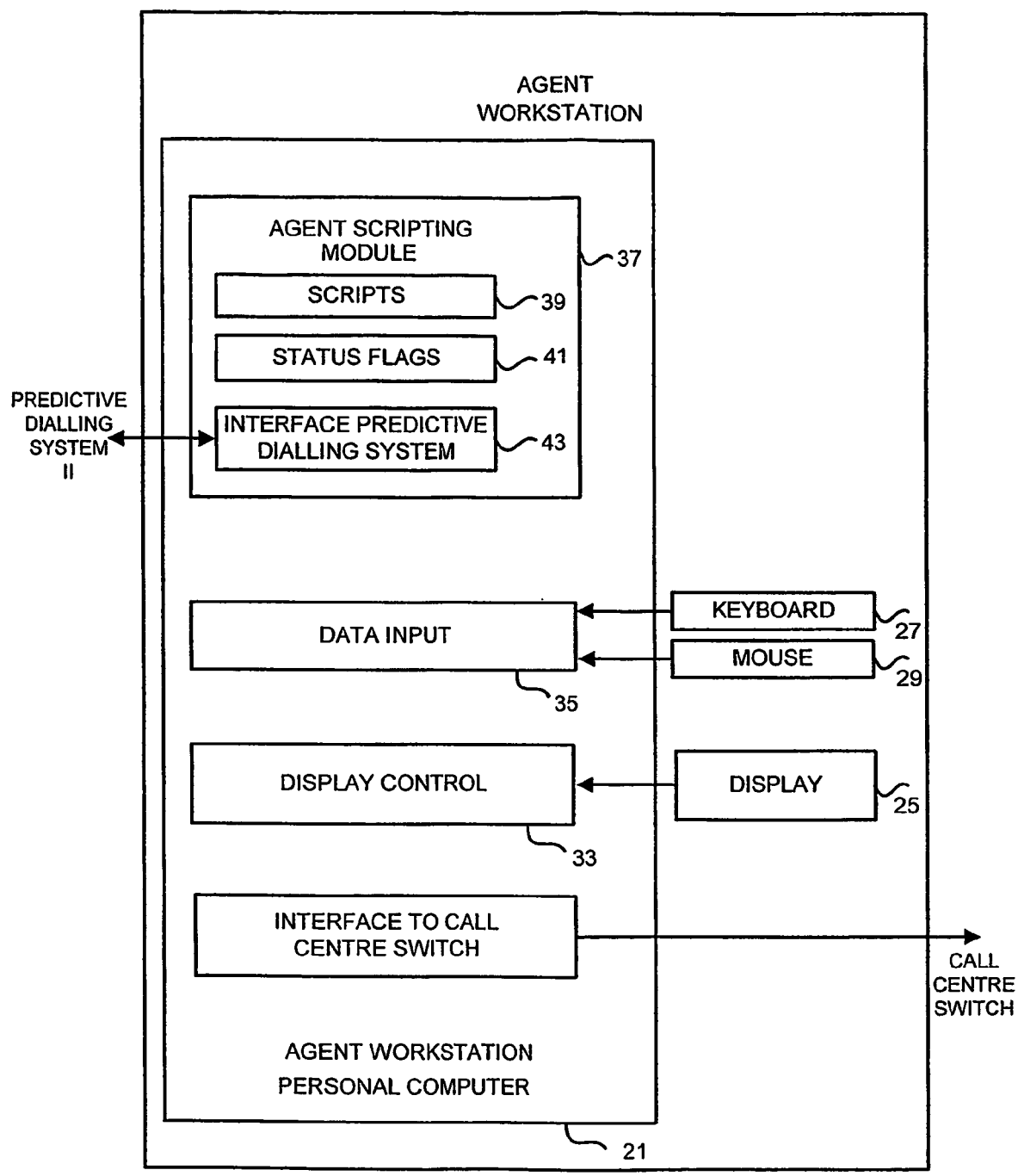
FIG. 2 illustrates the functional software and hardware modules at each agent workstation incorporated in the call centre system shown in FIG. 1.

Turning now to FIG. 2, this Figure illustrates the components of each agent workstation 1 to the extent required to understand the invention. Each workstation comprises a personal computer 21, a display 25, a keyboard 27 and a mouse 29. The personal computer 21 includes a display control unit 33 effective to control the display 25 and a data input unit 35 responsive to signals produced by the user using the keyboard 27 and mouse 29. Each agent telephone system 2 which is located at the workstation comprises a microphone and headset (not shown) of a type common in call centres.

In addition to the above conventional components, the personal computer 21 also includes an agent scripting module 37 including a store 39 storing a series of scripts which may be displayed on the display 25. Each script is designed to guide the conversation between the call centre agent and the telephone respondent for a particular purpose, for example an opinion poll of voting intentions for a forthcoming election, to enable the agent to extract specific information from the respondent. This information may be input into the data input unit 35 via the keyboard 27 and/or mouse 29 during the telephone conversation between the agent and the respondent as will be described in more detail hereafter.

Each script includes points within the script at which one or more "state." flags are automatically generated to indicate the progression of the agent through the script, these flags being stored in status flag buffer unit 41.

In the particular embodiment to be described, there are three "state" flags, designated "green", "amber" and "red", in which:

a "green" flag indicates that the call is approaching completion;

an "amber" flag indicates that completion is imminent; and a "red" flag indicates that the call is complete, and the agent is finishing off.

Signals including data representative of the generation of each flag is passed through an interface 43 to the predictive dialling system 11. Further signals indicating that the agent has actually finished the call and has reached an "idle" state are also be passed to the predictive dialling system 11. Finally, signals indicating that the agent has logged "on to" or "out from" the particular workstation 1 and thus has become available or is no longer available are generated at the relevant times by the agent scripting module 37 and passed through the interface 43 to the predictive dialling system 11.

Predictive Dialling System

Figure 3:
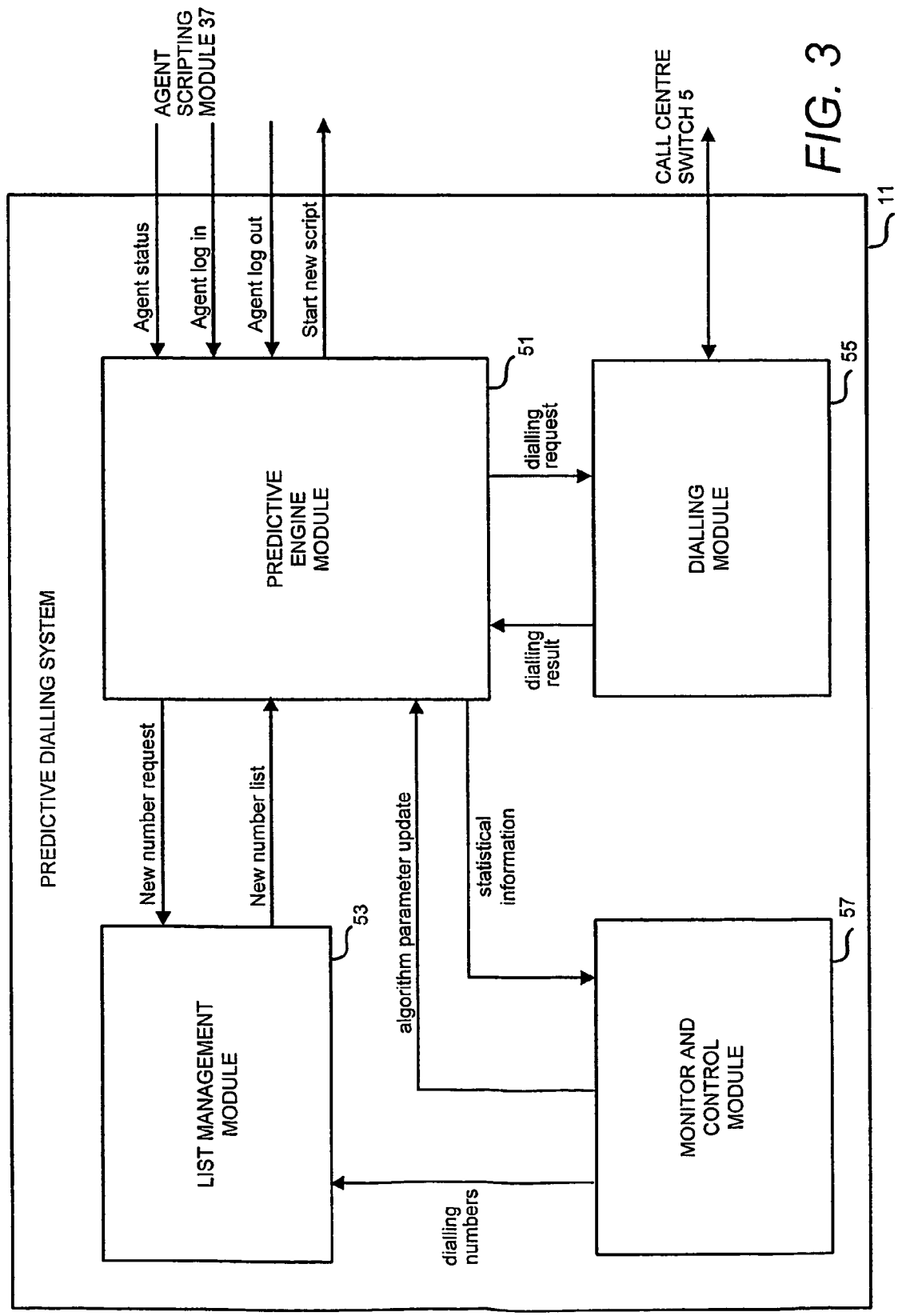
FIG. 3 illustrates the functional components of the predictive dialling system incorporated in the call centre system shown in FIG. 1 together with the message flow between each module.

Turning now to FIG. 3, this Figure is an overview of the various functional modules of the predictive dialling system 11.

Status signals representative of the flag states, "idle" states and log on or log off signals from the interface 43 in the agent scripting module 37 within each agent workstation 1 are received by a predictive engine module 51, this module also being effective to send signals back to the agent scripting module 37 in each workstation 1, these signals being effective to cause a new script stored in the script store 39 to start to run at the workstation 1.

The predictive engine module 51 is also linked to a list management module 53, a dialling module 55 and a monitor and control module 57. The list management module 53 stores the numbers to be dialled. The dialling module 55 is effective to send dialling requests to the call centre switch 5 and to receive information back from the call centre switch 5 as to whether each telephone 9 has been answered. The monitor and control module 57 is effective to provide dialling numbers to the list management module 53 and to provide control parameters to the predictive engine module 51.

Further details of each of the modules 51, 53, 55, 57 of the predictive dialling system will now be described in more detail with reference to FIGS. 4 to 7.

Figure 4:
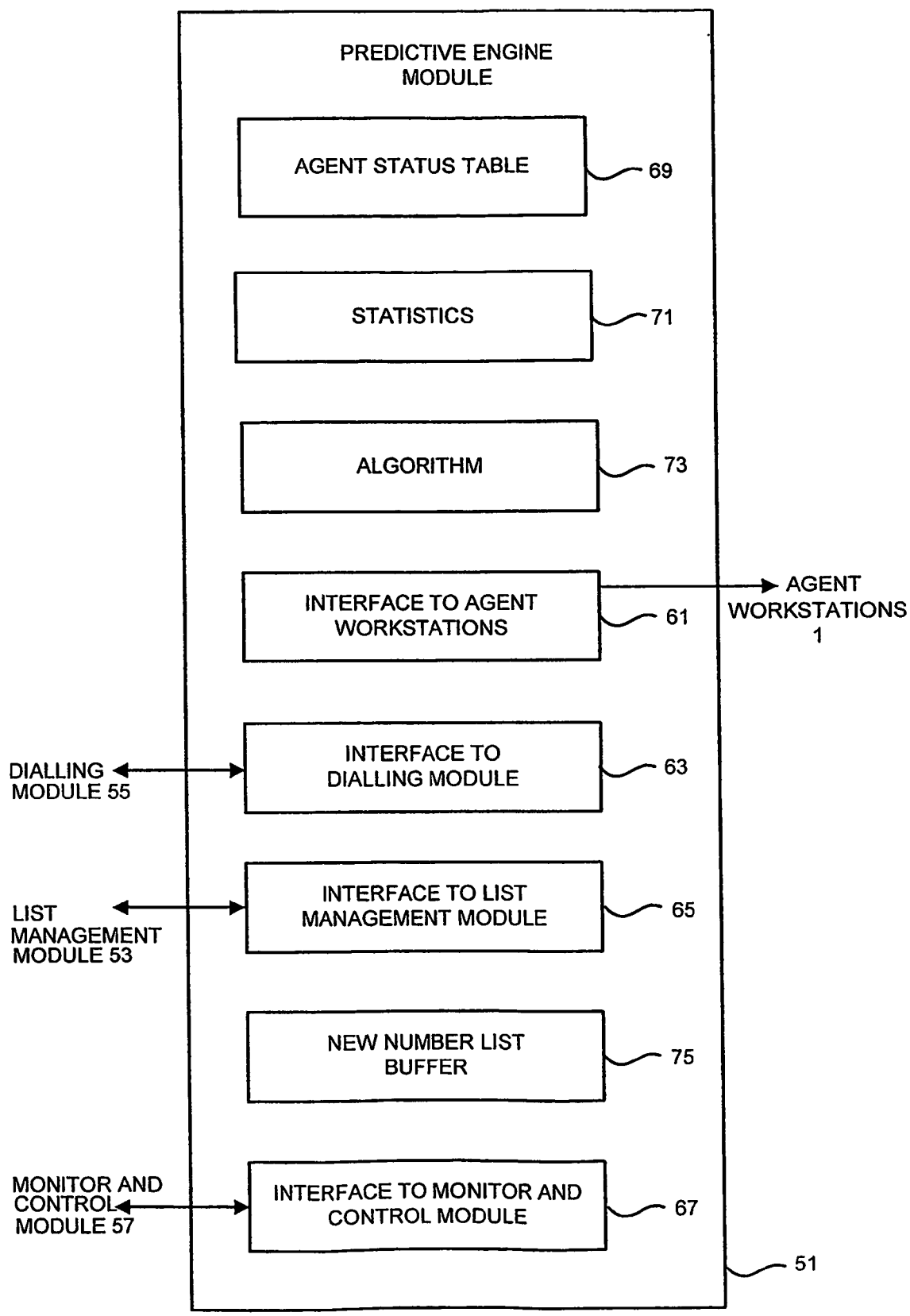
FIG. 4 illustrates the predictive engine module incorporated in the predictive dialling system shown in FIG. 3.

Turning now to FIG. 4, in response to the status signals and log in/log out signals received from the agent workstations and the parameters received from the monitor and control module 57, the predictive engine module 51 instructs dialling module 55 to dial numbers produced from numbers stored in the list management module 53. Thus the predictive engine module 51 includes respective interfaces 61, 63, 65, 67 to the agent workstations 1 connected to the LAN 3, the dialling module 55, the list management module 53 and the monitor and control module 57. The predictive engine module 51 also includes an agent status table 69 including data derived from the agent login and/or logout information signals and the flag and "idle" state signals provided from the agent workstations 1. A statistics unit 71 is provided for maintaining statistics over a predefined period of time, for example one hour.

The predictive engine module 51 also includes an algorithm module 73 programmed with an algorithm and the current variable values for use in the algorithm to enable the calculation of the number of respondent phones to be dialled at any particular time from the agent status information stored in the agent status table 69 and the statistical information provided to the predictive engine module from the monitor and control module 57 at that time. In the particular embodiment being described, the number of calls $N_{dial}$ which the system predicts should be dialled at any one time is given by the equation:

$$N_{dial} = I + \frac{\alpha I + \beta R + \chi A + \delta G}{S_r\left(\Theta + \tan\left(\frac{\pi N_r}{2N_t}\right)\right)} \quad (1)$$

where:
 I is the number of agents in the "Idle" state;
 R is the number of agents in the "Red" state;
 A is the number of agents in the "Amber" state;
 G is the number of agents in the "Green" state;
 $\alpha, \beta, \chi, \delta$ are constants set to predefined values;
 $S_r$ is the statistical success rate, i.e. the percentage of successful connections out of the total of calls made over time;
 $\Theta$ is an adjustment constant called the Overdial Factor;
 $N_r$ is the Nuisance Call rate expressed as a percentage; and
 $N_t$ is the Nuisance Call target rate expressed as a percentage.

It will be appreciated that equation (1) is an asymptotic function which will tend to a value proportional to the number of available agents as the nuisance rate meets the nuisance call target and the agents progress towards their "idle" state. It will also be appreciated that equation (1) is only one example of an algorithm which may be used by a predictive dialling system in accordance with the invention.

Figure 5:
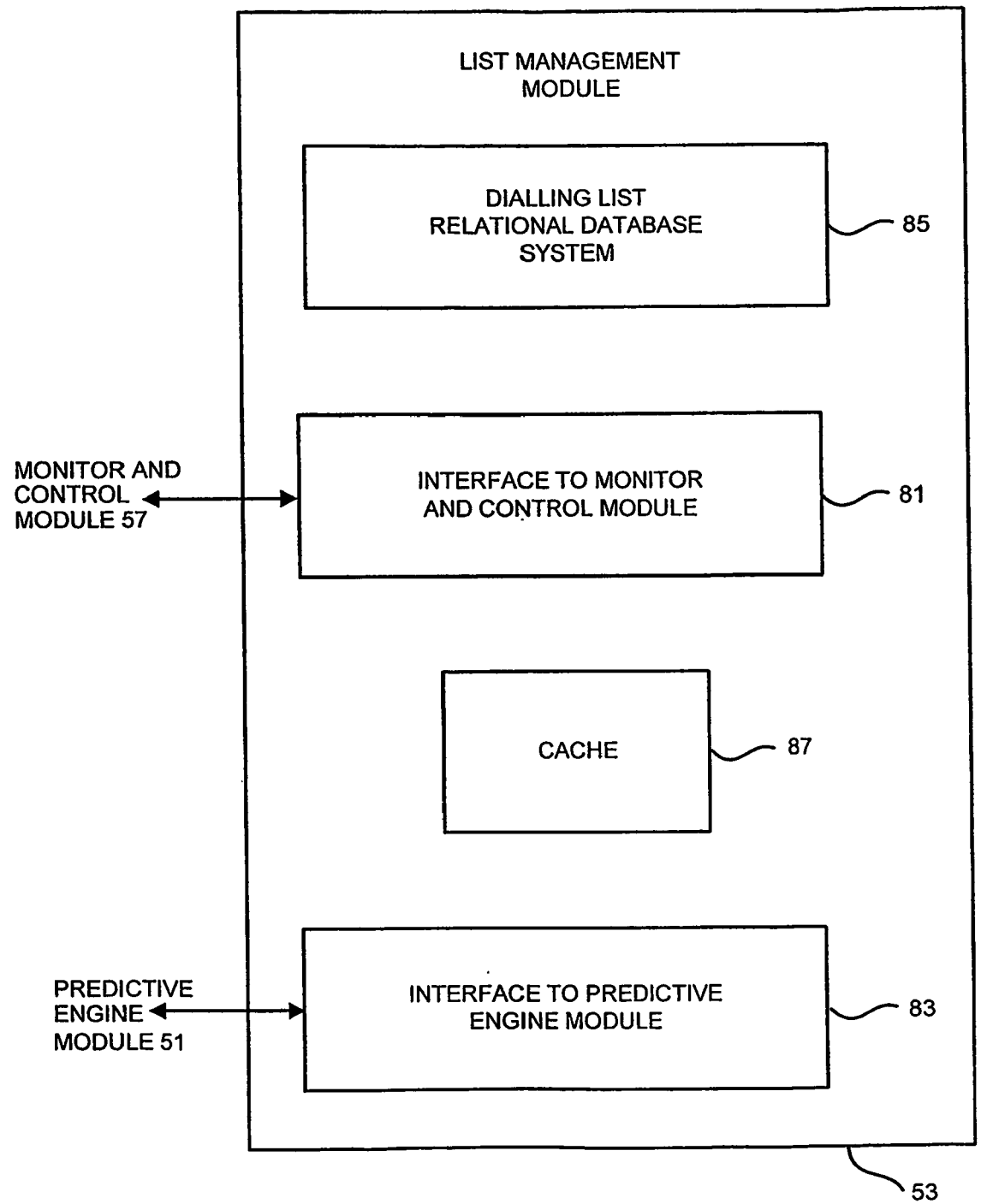
FIG. 5 illustrates the functional components of the list management module incorporated in the predictive dialling system of FIG. 3.

Turning now to FIG. 5, the list management module 53 contains respective interfaces 81, 83 to the monitor and control module 57 and the predictive engine module 51. The list management module 53 includes a relational database system 85 including a list of all of the numbers to be dialled using any particular script stored in the agent workstations 1, together with a cache 87 storing the dialling numbers to be included in the next list of new numbers to be dialled.

Figure 6:
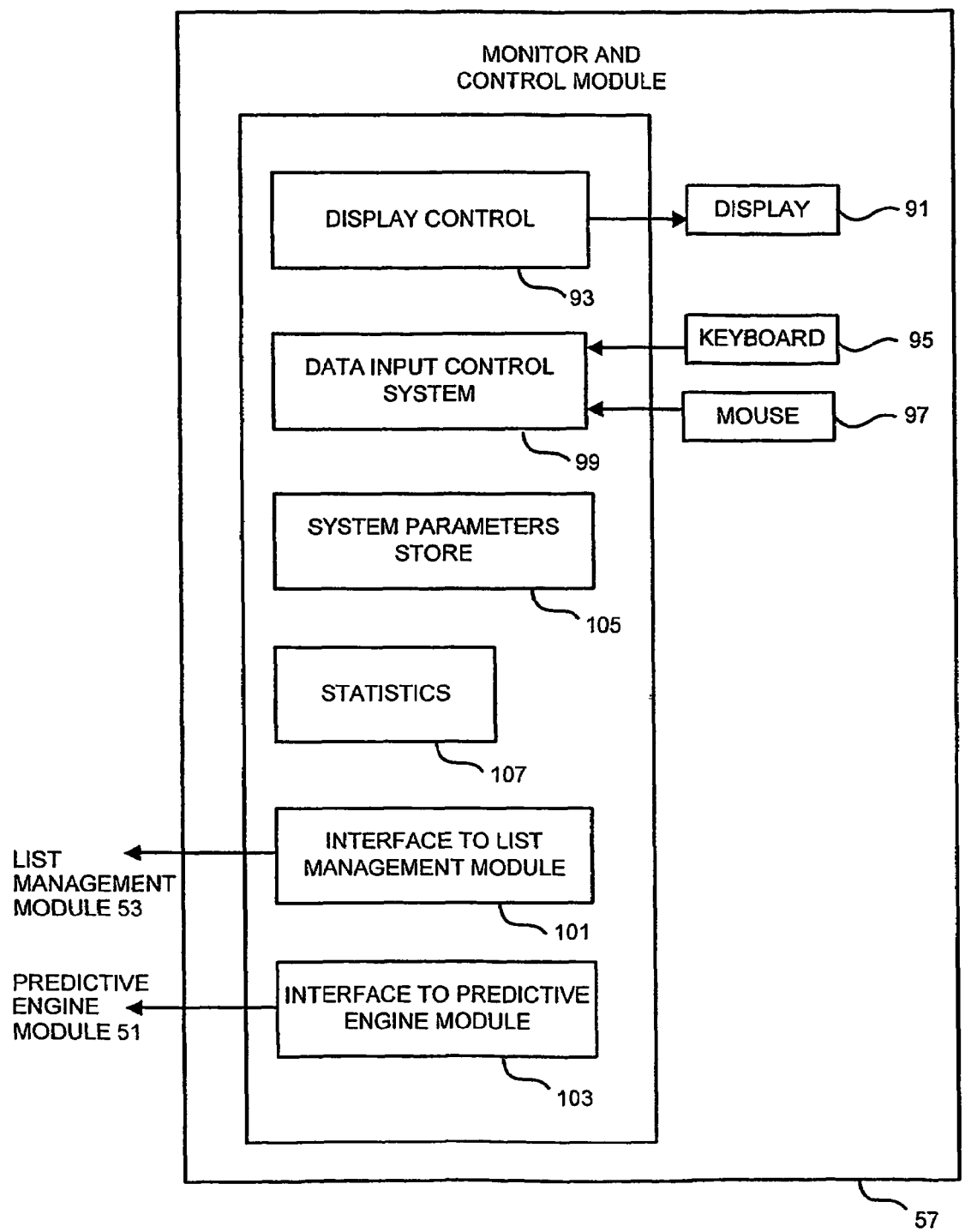
FIG. 6 illustrates the functional components of the monitor and control module incorporated in the predictive dialling system of FIG. 3.

Turning now to FIG. 6, the monitor and control module 57 is a user interface and thus includes a display 91 together with a display control unit 93, a keyboard 95 and mouse 97 together with a data input control system 99. Interfaces 101, 103 are provided to respectively the list management module 53 and the predictive engine module 51. The monitor and control module 57 also includes a store 105 for the current system parameters 105 for use in equation (1) and a statistics store 107 storing statistical information for the system.

Figure 7:
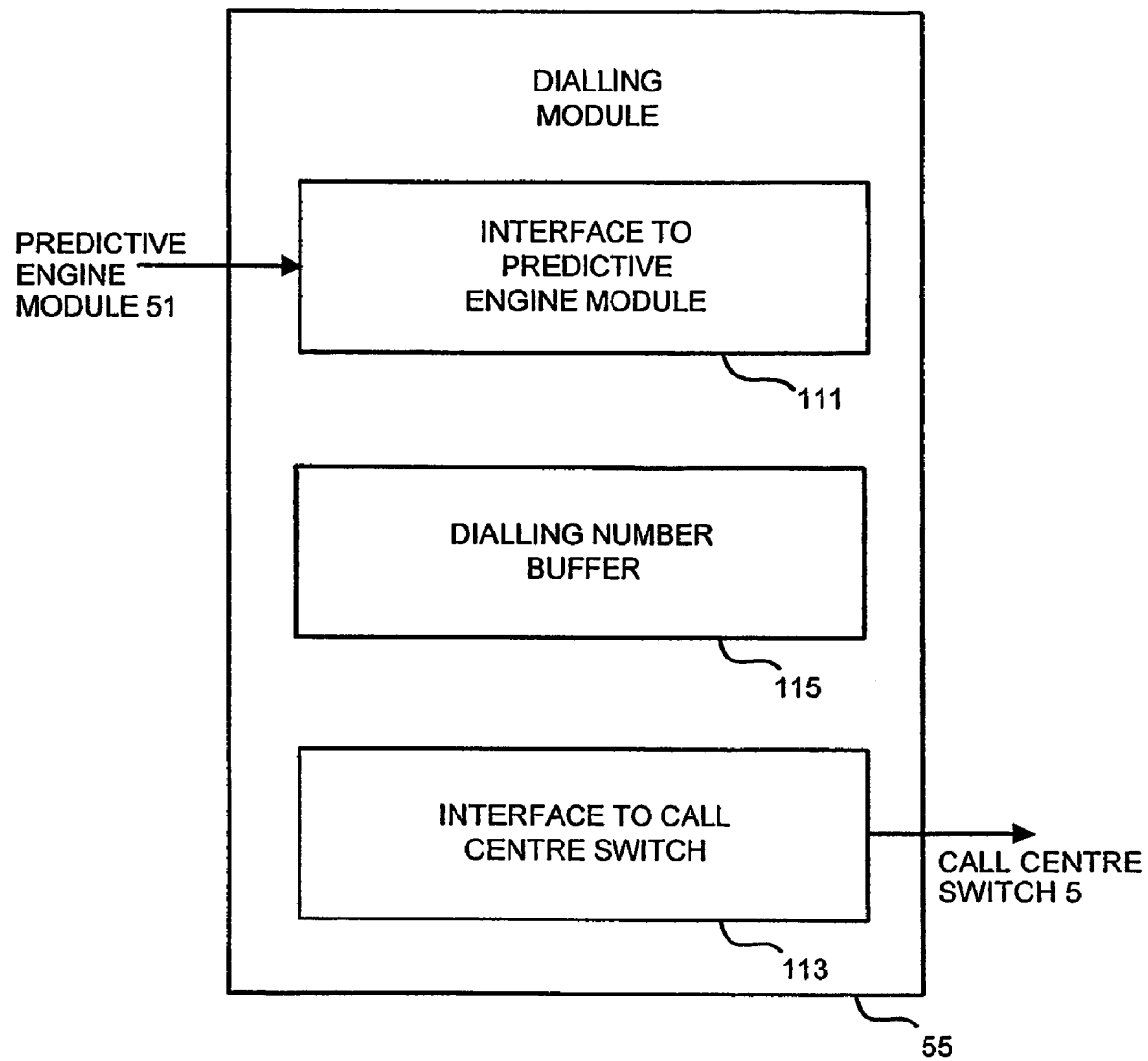
FIG. 7 illustrates the functional components of the dialling module incorporated in the predictive dialling system of FIG. 3.

Finally turning to FIG. 7, the fourth unit in the predictive dialling system 11, that is the dialling module 55 includes respective interfaces 111 and 113 to the predictive engine module 51 and the call centre switch 5, together with a buffer 115 for storing the next numbers to be dialled.

Operation of the Predictive Dialling System

An example of the use of the system described above will now be given with reference to FIG. 8 which is an example of a screen on the display 25 of one of the agent workstations 1 when a script is running. In the particular script, which is designed as part of an opinion poll to determine voting intentions at an election, the agent must work through a series of screens including prompted questions to which various telephone respondent answers are possible. These answers are entered by the agent at the appropriate point on the screen using the mouse 29, to be communicated as a series of message data using extendible mark-up language through the display input unit 35 through the network 3 to the central database 10.

In the particular embodiment being described, the scripting software is designed to react to the answers to the questions as entered by the agent on the screen of the display 25 so as to present automatically a different screen in the event that the person being called indicates that they are not entitled to vote, this leading to the end of the script. Suitable scripting software is produced by Noetica Limited under the trade mark "Synthesys"™ which is a particular scripting software enabling a client to produce scripts of a format suitable for any application without knowing the details of the program structure. In an adaptation of such software and in accordance with the invention, the software enables the production of the "green", "amber" and "red" state flags discussed above at appropriate points within the script.

Thus in the particular example illustrated in FIG. 8 in the first screen "interviewee" the agent would typically be prompted to ask the question:
 "Are you a resident of the household?"

to ascertain whether the person who has answered the phone is actually resident in the particular household followed by the question:
 "Are you entitled to vote?"

If the answer is negative, the scripting program passes to the end of the script. However, assuming a positive answer, the scripting system will pass to the next screen "background" at which point the agent would be prompted to ask the question:
 "How old are you?"

followed by:
 "What is your occupation?"

On completion of the second screen, the system passes to the third screen which relates to the respondent's voting at the previous election with the question:
 "Did you vote in the last election?", and if the answer is positive:
 "How did you vote in the last election?"

with the agent being given the choices of the various parties, "Labour", "Liberal Democrat" and "Conservative" or "Other Parties", "undecided" or "will not say".

The final screen as illustrated in FIG. 8 shows the answer given in response to the message:
 "Will you vote in the next election?"

as
 "What is your voting intention in the next election?"

At appropriate points within the script, on passing the "green" and "amber" flag points, appropriate signals are sent to the predictive engine module 51 in the predictive dialling system. On entering the answer to the final question, the interface predictive dialling system 43 prompts the generation of a "red" flag. Completion of the call leads to the agent being set into an "idle" mode with the time at which the call was completed also being logged and an appropriate message sent to the predictive engine module 51.

The above information during the running of a script at each workstation 1 is communicated to the predictive engine module where it is stored in the agent status table 69 which will typically have entries of the following form, but with substantially more entries:

TABLE 1

| AGENT ID | LOG OFF | LOG IN | GREEN FLAG | AMBER FLAG | RED FLAG | IDLE |
|---|---|---|---|---|---|---|
| 1 | ✓ 19.00 | | | | | |
| 2 | | ✓ 18.00 | ✓ 18.02.01 | | | |
| 3 | | ✓ 10.10 | | | ✓ 18.05.00 | |
| 4 | | ✓ 18.06 | | | | ✓ 18.06.20 |

In the particular example shown in the Table, the first agent has logged off and thus the predictive engine module 51 knows that this agent is not available. Agents 2 and 3 are at respectively the "green" flag and the "red" flag stage while the agent 4 reached the idle stage at 18.06.20. The table thus enables the predictive engine module 51 to derive values for I, R, A and G for use in equation (1).

Based on this information together with the statistical information relating to the statistical success rate $S_r$, the constants $\alpha, \beta, \chi, \delta$, the value of $\Theta$, the calculated nuisance call rate $N_r$ and the nuisance call target $N_t$ which are received from the monitor and control module 57, the predictive engine module 51 is able to calculate from the stored algorithm, equation (1), the number of calls $N_{dial}$ which should be dialled at that time. Where an agent logs in or out, the number of idle agents is increased or decreased accordingly.

The newly-calculated value of $N_{dial}$ is compared with the previously calculated value $N_{dial}$ for calls which are currently in the process of being dialled. If the calculated value of $N_{dial}$ has increased, new numbers to be dialled are initiated and a new number request is sent to the list management module 53 from the predictive engine module 51. However, if the value of $N_{dial}$ has decreased, no new numbers to be dialled are initiated and if the difference between the previous and current values of $N_{dial}$ is more than a predetermined value, then some of the telephone numbers currently being dialled are cancelled by hanging up. However as the value of $N_{dial}$ is calculated in response to every message received by the predictive engine module 51 from the engine scripting module 37 at each agent workstation 1, or from the monitor and control module 57 as parameter updates, the value of $N_{dial}$ should not fluctuate greatly.

Whenever the predictive engine module 51 requires new numbers to dial, a new number request message is sent to the list management module 53 including an indication of the difference between the number of telephone numbers which are currently in the process of being dialled and the value of $N_{dial}$. In response to this message, a new number list including the required number of new telephone numbers which have been held in the cache 87 in the list management module, is immediately sent to the predictive engine module 51 and the telephone numbers in the cache 87 are replaced by further telephone numbers from the dialling list stored in the relational database system 85 to avoid delays being generated whilst this data is read out from the database system 85.

The predictive engine module 51 stores the new numbers in a new number list buffer 75 whilst sending a dialling request message through the dialling module 55, where the new numbers are held in a dialling buffer 115 before being passed via interface 113 to the call centre switch 5. The dialling module 55 receives dialling result information back from the call centre switch 5 as to whether each dialling request was successful and that the call is now connected, or if the dialling request for any telephone number failed. If the dialling request for any telephone number does fail, a message indicating the reason for the failure such as "busy", "no answer", "phone switched to answerphone" is sent by the call centre switch 5 through the dialling module 55 to the predictive engine module 51, this information being recorded in the statistics store 71 in the predictive engine module 51. If, however, the dialling request is successful and the call centre switch has allocated the call to one of the agent telephone systems 2-1, 2-2, 2-n, the predictive engine module 51 sends a new script message to the appropriate agent workstation 1-1, 1-2, . . . , 1-n.

Statistical information from the predictive engine module 51 is passed to the monitor and control module 57 for storage and analysis in the statistics module 107 in the monitor and control module. A system manager is able to cause this information to be displayed on the display 91, to enable the system manager to decide whether to amend the system parameters and the system parameter store 105 to change the values used by the algorithm in the algorithm unit 73 in view of the performance of the system. The dialling result information may be used to modify, for example, the times at which the calls are made. Alternatively, these modifications may be done automatically by means of the feedback of performance statistics to the monitor and control module 57.

It will be appreciated that any form of scripting software may be used. However a particularly advantageous form of scripting is an adaptation of that provided by Noetica Ltd as described above.

It will be appreciated that the invention may be implemented by software running in both the predictive dialling system and software running in each agent workstation. Such software may be carried on a computer carrier or be downloaded as a signal from a network or from the Internet.

It will be appreciated that whilst one particular form of call centre has been described in which each call centre agent has an independent workstation and telephone system, the invention is applicable to other forms of call centre, for example where each workstation 1 is integrated with a telephone system 2, with the voice and data networks also being integrated.

The invention claimed is:

1. A predictive dialing system for a call center including a plurality of agent workstations, each agent workstation comprising:

a display prompting system for producing signals effective to cause a display to display a script for prompting the agent in a telephone conversation with a telephone respondent;

an entering system for entering information obtained from the telephone respondent in response to questions prompted by the script into the workstation; and a status signal production system for producing a series of status signals indicative of the progression of the agent through the script;

the predictive dialing system comprising:

a storage system for storing statistical data regarding the connection of previous telephone calls;

a reception system for progressively receiving the series of status signals produced by each agent station;

a prediction system for predicting from the statistical data and those of the series of status signals received at any time how many new calls should be dialed to enable agents, who have finished their previous call by the time each new call is answered by a respective telephone respondent, to take all the new calls; and a generation system, for generating signals effective to cause said new calls to be dialed.

2. A predictive dialing system according to claim 1 including a database system for storing telephone numbers to be called, and a cache for storing a selection of the stored telephone numbers, wherein when the prediction system predicts the number of new calls to be made, the appropriate number of telephone numbers are retrieved from the cache.

3. A predictive dialing system according to claim 1 wherein the statistical data comprises the percentage of successful telephone connections made out of the total number of calls over a predetermined period of time.

4. A predictive dialing system according to claim 1 wherein the statistical data comprises an indication of the number of calls in excess of the number of available agents which the system can tolerate.

5. A predictive dialing system according to claim 1 wherein the statistical data includes the ratio of the nuisance call rate to the nuisance call rate target.

6. A predictive dialing system according to claim 1 in which said prediction system is arranged to predict the number, $N_{dial}$, of calls I from the number I of available agents currently not engaged on a call, the number R, A, G of agents who have currently reached predefined points within a script, the percentage $S_r$ of successful connections out of the total number of calls made in a predetermined time period, the percentage $N_r$ of calls answered by a respondent but with no agent available to take the call measured over a predetermined time period, and the target percentage $N_t$ of calls answered by a respondent but with no agent available to take the call.

7. A predictive dialing system according to claim 6 wherein $$N_{dial} = I + \frac{\alpha I + \beta R + \chi A + \delta G}{S_r\left(\theta + \tan\left(\frac{\pi N_r}{2N_t}\right)\right)}$$

where I is the number of available agents currently not engaged on a call;

R, A and G are the number of agents who have reached predetermined points in their respective scripts and have sent said status signals to the predictive dialing system;

α, β, χ, δ are constants;

$S_r$ is the percentage of successful connections out of the total number of calls made measured over a predetermined time period;

θ is an adjustment constant;

$N_r$ is the percentage of calls answered by a telephone respondent but with no agent available to take the call measured over a predetermined time period; and $N_t$ is the target percentage of calls answered by a telephone respondent but with no agent available to take the call.

8. A predictive dialing system according to claim 1 including an adjustment system for adjusting the parameters used by the prediction system.

9. A predictive dialing system according to claim 8 including a user interface system for providing a user interface enabling display of the statistical performance of the system, and an enabling system for enabling a user to adjust said parameters.

10. A predictive dialing system according to claim 1 in which where the number of calls which are predicted is less than the calls which are currently being dialed, the system includes a cancellation system for cancelling some of the calls currently being dialed.

11. A predictive dialing system according to claim 1 including a new script initiation system for sending a signal to a workstation effective to initiate the running of a new script at the workstation when the workstation has been allocated a new answered telephone call.

12. A scripting system for use in an agent workstation in a call center, the workstation comprising:
a system for receiving telephone calls; and
a display;
the scripting system comprising:
a display prompting system for providing signals effective to cause the display means to display a script for prompting an agent in a telephone call with a telephone respondent;
a system for recording information obtained from the telephone respondent and sending signals representative of said information to a storage means;
a status signal production system for producing a series of status signals representative of the progression of the agent through the script; and
a system for progressively sending said series of status signals to a predictive dialing system.

13. A scripting system according to claim 12 including a reception system for receiving signals from the predictive dialing system effective to initiate the display of a new script synchronised with the receipt of a new telephone call.

14. A predictive dialing method for a call center including a plurality of agent workstations, each agent workstation performing the steps of:
producing a signals effective to cause a display to display a script for prompting the agent in a telephone conversation with a telephone respondent;
entering information obtained from the telephone respondent in response to questions prompted by the script into the workstation; and
producing a series of status signals indicative of the progression of the agent through the script;
the predictive dialing method comprising:
storing statistical data regarding the connection of previous telephone calls;
progressively receiving the status signals produced by each agent station;
predicting from the statistical data and those of the series of status signals which have been received at any time how many new calls should be dialed to enable agents who have finished their previous call by the time each new call is answered by a telephone respondent to take all the new calls; and
generating signals effective to cause said new calls to be dialed.

15. A predictive dialing method according to claim 14 including storing telephone numbers to be called in a database system, and storing a selection of the stored telephone numbers in a cache, wherein when the predicting means predicts the number of new calls to be made, the appropriate number of telephone numbers are retrieved from the cache.

16. A predictive dialing method according to claim 14 wherein the statistical data comprises the percentage of successful telephone connections made out of the total number of calls over a predetermined period of time.

17. A predictive dialing method according to claim 14 wherein the statistical data comprises an indication of the number of calls in excess of the number of available agents which the system can tolerate.

18. A predictive dialing method according to claim 14 wherein the statistical data includes the ratio of the nuisance call rate to the nuisance call rate target.

19. A predictive dialing method according to claim 14 in which where the number of calls which are predicted is less than the calls which are currently being dialed, cancelling some of the calls currently being dialed.

20. A predictive dialing method according to claim 14 in which said predicting step predicts the number, $N_{dial}$, of calls from the number of available agents currently not engaged on a call, the number of R, A, G agents who have currently reached predefined points within a script, the percentage $S_r$ of successful connections out of the total number of calls made in a predetermined time period, the percentage of calls answered by a respondent but with no agent available to take the call measured over a predetermined time period, and the target percentage $N_t$ of calls answered by a respondent with no agent available to take the call.

21. A predictive dialing method according to claim 20 wherein $$N_{dial} = I + \frac{\alpha I + \beta R + \chi A + \delta G}{S_r\left(\theta + \tan\left(\frac{\pi N_r}{2 N_t}\right)\right)}$$

where I is the number of available agents currently not engaged on a call;
R, A and G are the number of agents who have reached predetermined points in their respective scripts and have sent said status signals to the predictive dialing system;
$\alpha, \beta, \chi, \delta$ are constants;
$S_r$ is the percentage of successful connections out of the total number of calls made measured over a predetermined time period;
$\theta$ is an adjustment constant;
$N_r$ is the percentage of calls answered by a telephone respondent but with no agent available to take the call measured over a predetermined time period; and
$N_t$ is the target percentage of calls answered by a telephone respondent but with no agent available to take the call.

22. A predictive dialing method according to claim 14 including the step of sending a signal to a workstation effective to initiate the running of a new script at the workstation when the workstation has been allocated a new answered telephone call.

23. A scripting method in an agent workstation in a call center, the workstation comprising:
a reception system for receiving telephone calls; and
a display arrangement;
the scripting method comprising the steps of:
providing signals effective to cause the display means to display a script for prompting an agent in a telephone call with a telephone respondent;
recording information obtained from the telephone respondent and sending signals representative of said information to a store;
producing a series of status signals representative of the progression of the agent through the script; and
progressively sending said status signals to a predictive dialing system.

24. A scripting method according to claim 23 including the step of receiving signals from the predictive dialing system effective to initiate the display of a new script synchronised with the receipt of a new telephone call.

25. A computer program product, tangibly embodied in a computer-readable medium, the computer program product comprising instructions operable to cause data processing apparatus to perform a predictive dialing method for a call center associated with a plurality of agent workstations, wherein each agent workstation is configured to produce signals effective to cause a display to display a script for prompting the agent in a telephone conversation with a telephone respondent, enter information obtained from the telephone respondent in response to questions prompted by the script into the workstation, and produce a series of status signals indicative of the progression of the agent through the script, the predictive dialing method comprising:
storing statistical data regarding the connection of previous telephone calls;
progressively receiving the status signals produced by each agent station;
predicting from the statistical data and those of the series of status signals which have been received at any time how many new calls should be dialed to enable agents who have finished their previous call by the time each new call is answered by a telephone respondent to take all the new calls; and
generating signals effective to cause said new calls to be dialed.

26. A call center including a plurality of agent workstations, each agent workstation comprising:
a display prompting system for producing signals effective to cause a display to display a script for prompting the agent in a telephone conversation with a telephone respondent;
an entering system for entering information obtained from the telephone respondent in response to questions prompted by the script into the workstation;
a status signal production system for producing a series of status signals indicative of the progression of the agent through the script; and
a predictive dialing system comprising:
a storage system for storing statistical data regarding the connection of previous telephone calls;
a reception system for progressively receiving the series of status signals produced by each agent station;
a prediction system for predicting from the statistical data and those of the series of status signals received at any time how many new calls should be dialed to enable agents, who have finished their previous call by the time each new call is answered by a respective telephone respondent, to take all the new calls; and
a generation system, for generating signals effective to cause said new calls to be dialed.

27. In an agent workstation for use in a call center, the workstation comprising:
a system for receiving telephone calls;
a display, and
a scripting system comprising:
a display prompting system for providing signals effective to cause the display means to display a script for prompting an agent in a telephone call with a telephone respondent;
a system for recording information obtained from the telephone respondent and sending signals representative of said information to a storage means;
a status signal production system for producing a series of status signals representative of the progression of the agent through the script; and
a system for progressively sending said series of status signals to a predictive dialing system.

* * * * *

(12) EX PARTE REEXAMINATION CERTIFICATE (8316th)
United States Patent
Singer

(10) Number: US 7,295,668 C1
(45) Certificate Issued: Jun. 7, 2011

(54) PREDICTIVE DIALING BY MONITORING PROGRESS OF AGENT SCRIPT

(75) Inventor: Danny Singer, London (GB)

(73) Assignee: Noetica Ltd., London (GB)

Reexamination Request:
No. 90/011,154, Aug. 12, 2010

Reexamination Certificate for:
Patent No.: 7,295,668
Issued: Nov. 13, 2007
Appl. No.: 10/532,865
Filed: May 12, 2006

(22) PCT Filed: Oct. 28, 2003
(86) PCT No.: PCT/GB03/04671
§ 371 (c)(1),
(2), (4) Date: May 12, 2006
(87) PCT Pub. No.: WO2004/040889
PCT Pub. Date: May 13, 2004

(30) Foreign Application Priority Data
Oct. 29, 2002 (GB) .......................................... 0225154.4

(51) Int. Cl.
*H04M 3/00* (2006.01)

(52) U.S. Cl. ............................ 379/265.01; 379/265.02; 379/265.03; 379/265.1; 379/266.08; 379/309
(58) Field of Classification Search ............. 379/265.01
See application file for complete search history.

(56) References Cited

U.S. PATENT DOCUMENTS 6,804,346 B1 10/2004 Mewhinney

*Primary Examiner*—Ovidio Escalante

(57) ABSTRACT

A call centre includes a plurality of agent workstations, each agent workstation comprising means for entering information obtained from a telephone respondent in response to questions prompted by a script displayed on the display of the workstation, and means for producing status signals indicative of the progression of the agent through the script. A predictive dialling system receives status signals from each agent station and predicts from the status signals and statistical information regarding the number of calls previously made, how many new calls should be dialled to enable agents who have finished their previous call by the time the calls are answered to take the new calls.

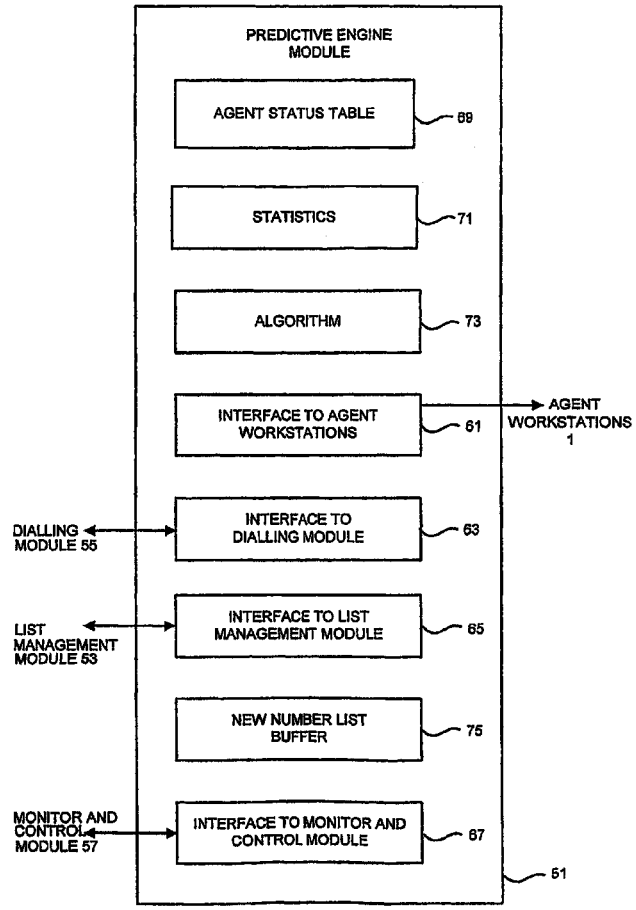

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentabilitiy of claim 19 is confirmed.

Claims 1-5, 8-18 and 22-27 are cancelled.

Claims 6, 7, 20 and 21 were not reexamined.

\* \* \* \* \*